Nov. 15, 1927.

F. F. FORSHEE 1,649,024

RANGE SWITCH ASSEMBLY

Filed Dec. 29, 1925     4 Sheets-Sheet 1

WITNESSES:
C. J. Weller.
G. B. Fjoflat

INVENTOR
Frank F. Forshee.
BY
Wesley G. Carr
ATTORNEY

Nov. 15, 1927.

F. F. FORSHEE 1,649,024

RANGE SWITCH ASSEMBLY

Filed Dec. 29, 1925     4 Sheets-Sheet 3

WITNESSES:

INVENTOR
Frank F. Forshee.
BY
Wesley G. Carr
ATTORNEY

Nov. 15, 1927.　　　　　　　　　　　　　　　　　　　1,649,024
F. F. FORSHEE
RANGE SWITCH ASSEMBLY
Filed Dec. 29, 1925　　　　　　4 Sheets-Sheet 4
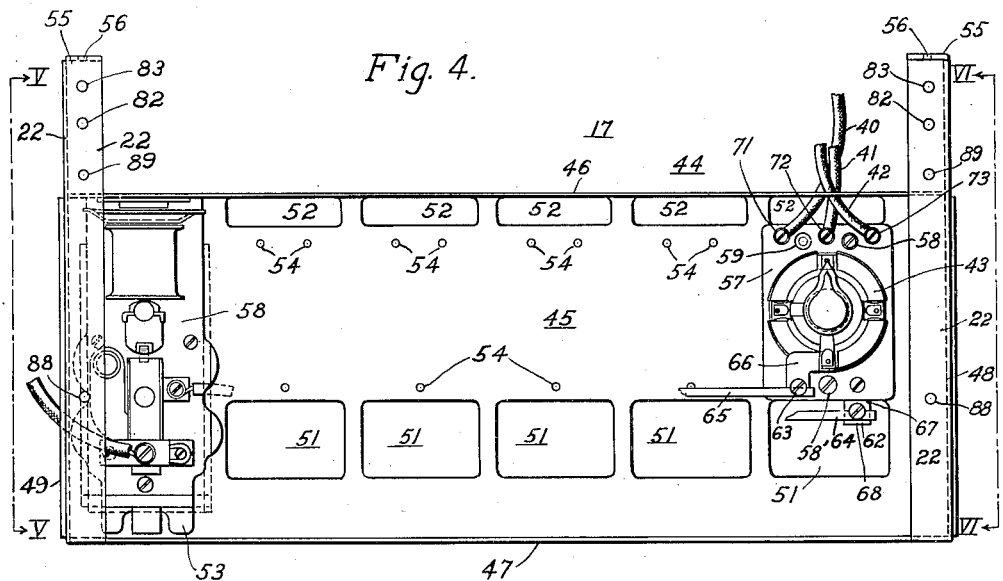
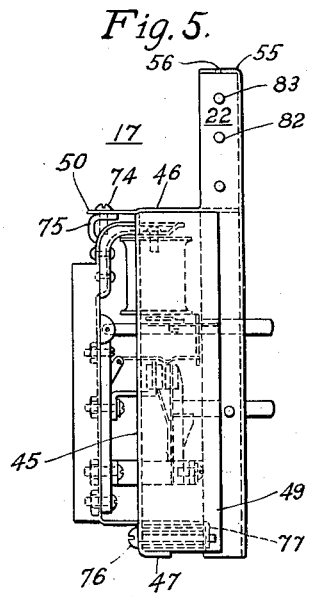
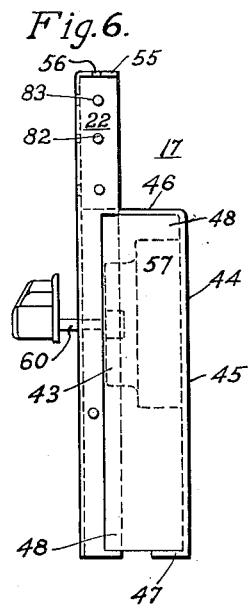
WITNESSES:
INVENTOR
Frank F. Forshee.
BY
ATTORNEY Patented Nov. 15, 1927.

1,649,024

UNITED STATES PATENT OFFICE.

FRANK F. FORSHEE, OF MANSFIELD, OHIO, ASSIGNOR TO WESTINGHOUSE ELECTRIC & MANUFACTURING COMPANY, A CORPORATION OF PENNSYLVANIA.

RANGE SWITCH ASSEMBLY.

Application filed December 29, 1925. Serial No. 78,102.

My invention relates to electric ranges and particularly to switch apparatus for such ranges.

An object of my invention is to provide switch apparatus for electric ranges wherein the individual switches may be assembled as a unit independently of the range assembly.

Another object of my invention is to provide a unitary switch panel for an electric range that shall contain all the switches and the circuit breaker and that shall partially support the stove member thereon.

In practicing my invention, I provide an electric range having an oven member and a stove member supported by suitable leg members. I provide also heating units for the stove and oven members. A unitary switch structure is provided comprising a plurality of individual switch members, whereby the aforesaid heating members may be selectively connected to a source of electric power supply, and a circuit breaker for the oven heating units mounted on an integral panel.

Figure 1:
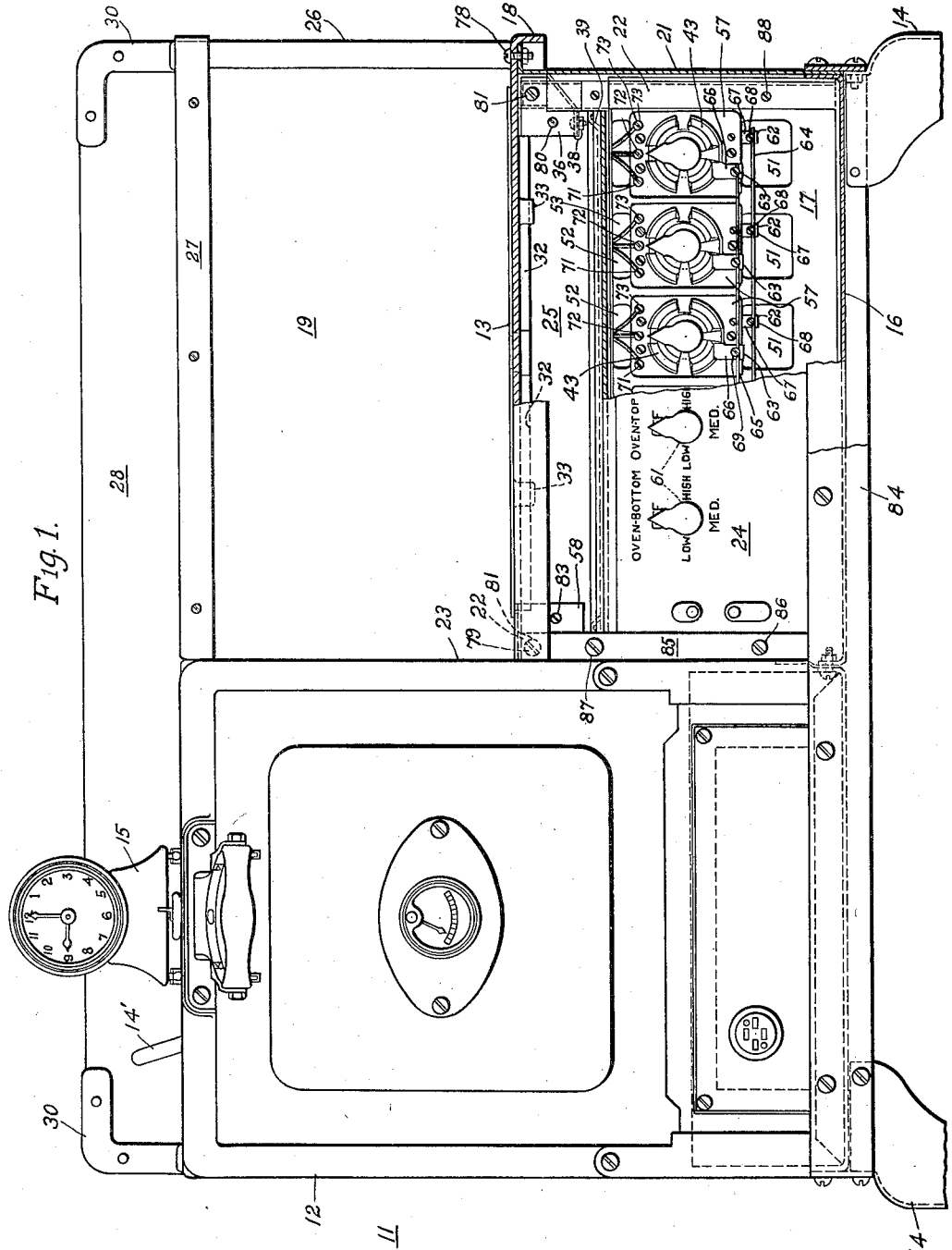
Figure 2:
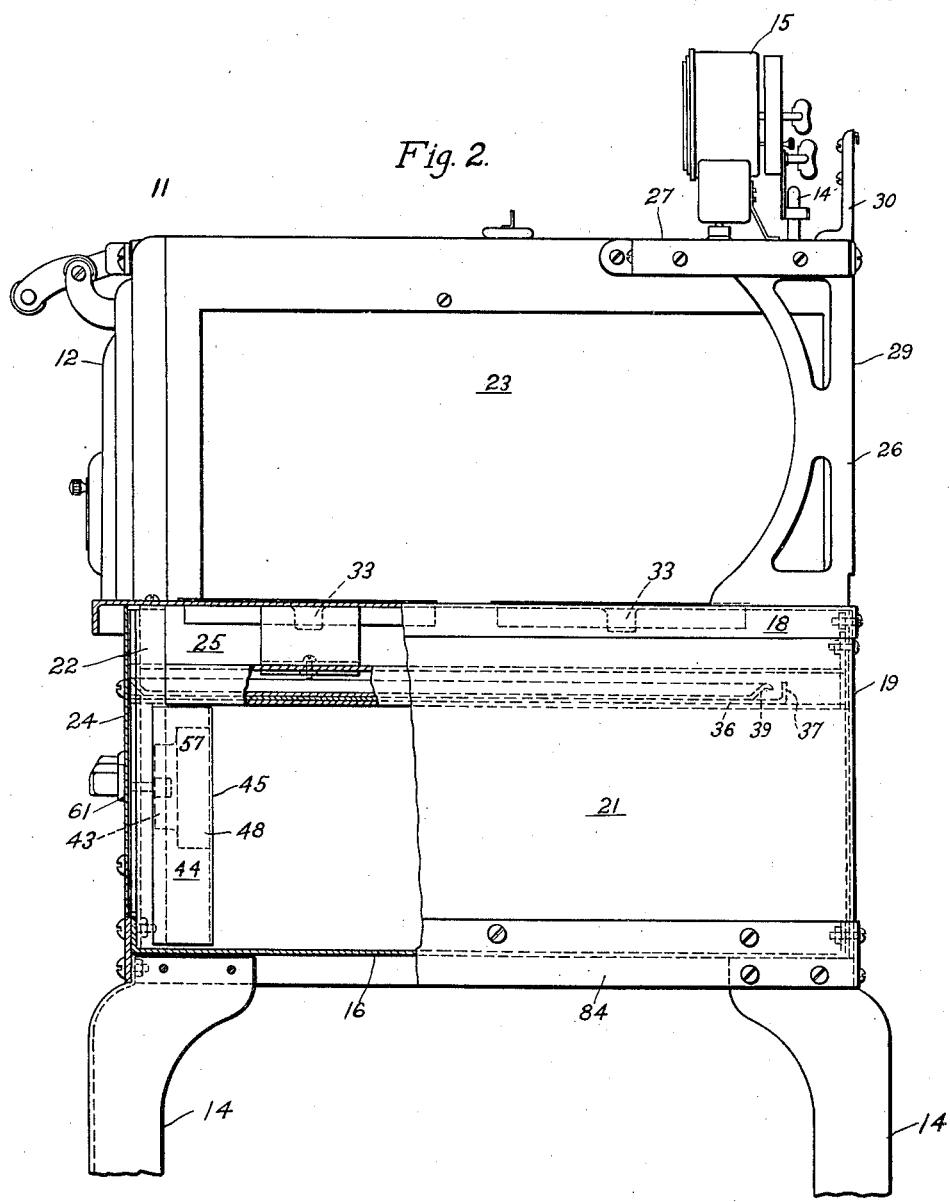
Figure 3:
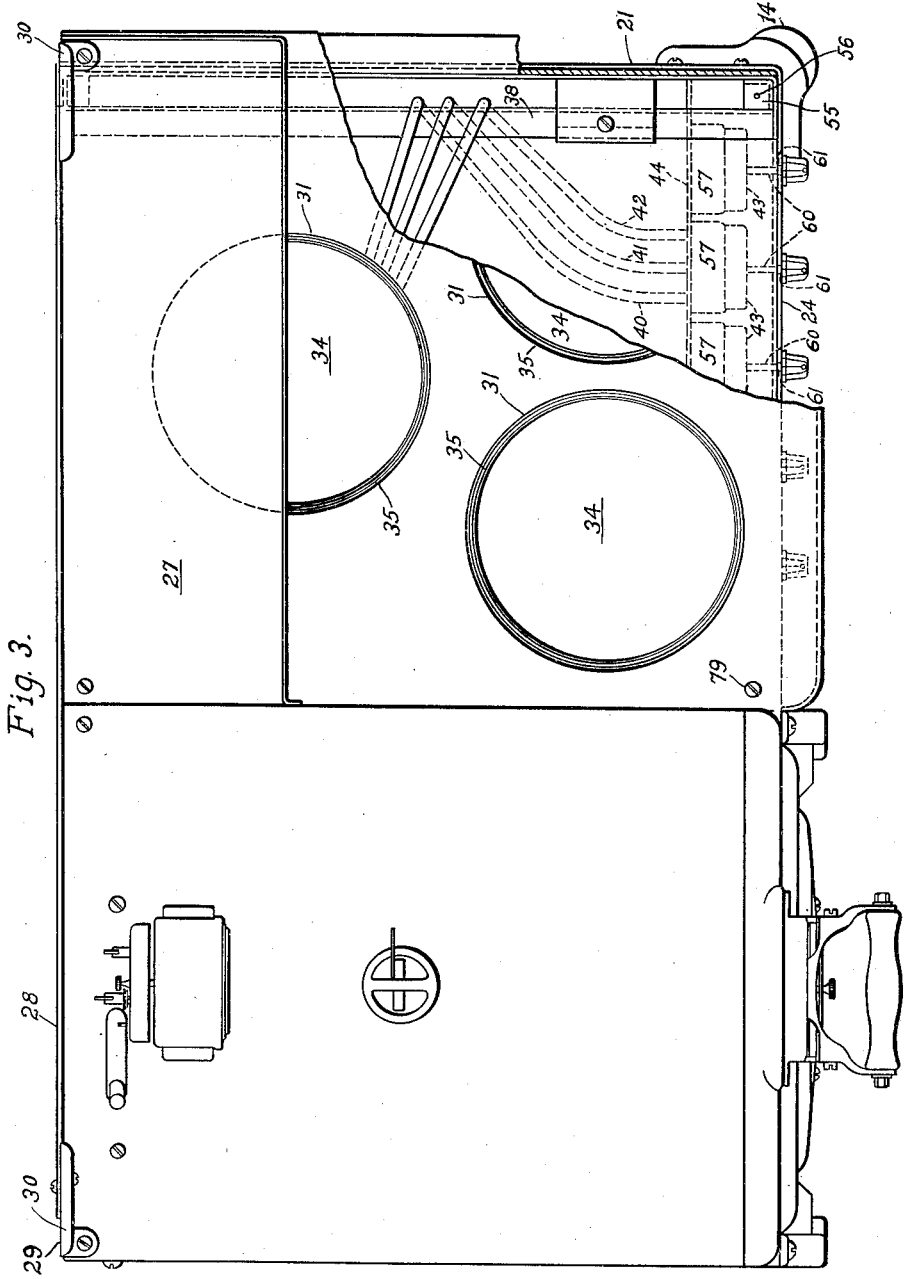

In the accompanying sheets of drawings,

Figure 1 is a front view, partially in section and partially in elevation, of an electric range embodying my invention, Fig. 2 is an end view, partially in section and partially in elevation, of the range illustrated in Fig. 1, Fig. 3 is a top plan view, with parts cut away, of the structure illustrated in Figs. 1 and 2, Fig. 4 is a front elevational view of the switch panel embodying my invention.

Fig. 5 is an end view of the device illustrated in Fig. 4, looking in the direction of the arrows V—V, and Fig. 6 is an end view of the device illustrated in Fig. 4, looking in the direction of the arrows VI—VI.

Referring more particularly to Fig. 1, a range structure 11 comprises an oven member 12, a stove member 13 and supporting members 14. The oven structure has a pair of heating units located therein. An electric circuit connecting the units within the oven structure 12 is connected to a source of electric power supply through a switch having an operating arm 14' that is controlled by a clock 15 located on the top of the oven structure 12.

The stove structure 13 comprises a box-shape member 16, a unitary switch panel 17 and a stove top 18. The stove top 18 is supported at the rear by a back panel 19, at one side by a panel 21, at the front by a pair of angle irons 22, and at the other side by a wall 23 of the oven structure 12. A panel 24 is attached to the front of the stove structure 13 and encloses the switch panel 17 therewithin. An opening 25 is provided between the stove top 18 and the panel 17 through which air may circulate thereby reducing the flow of heat from the stove top 18 downwardly into the space beneath said stove top.

The back panel 19 extends upwardly above the stove top 18 and is attached to the rear of the oven 12 and supported at one end by a bracket member 26. A shelf 27 extends from the oven 12 to the bracket 26. A back panel 28 is attached to the top of the shelf 27 and extends across the top of the oven 12 at the rear thereof along a wall 29. The ends of the back panel 28 are supported by brackets 30.

The stove top 18, as illustrated in Fig. 3, has holes 31 punched therein and the edges 32 thereof bent downwardly. Integral lugs 33 are provided on the edges 32 whereby heating units 34 may be supported in operative relation with the stove-top 18. An annular clearance space 35 between each of the heating units 34 is provided to reduce the flow of heat from the heating units 34 to the member 18.

A flat pan 36 having a bent portion 37 is provided in the opening 25 and is supported by a pair of channel guides 38 which are bolted to the angle irons 22 and to the back panel 19. The pan 36 is held in place by the panel member 24. The removable drip pan or crumb tray 36 is provided to catch any fluids that may overflow through the annular space 35 from vessels being heated on the units 34.

Each of the heating units 34 located in the stove top member 18 and those within the oven member 12, not shown, are electrically connected to an electric supply circuit by conductors 40, 41 and 42 to switch members 43, as illustrated in Fig. 3. The method by which the switches are connected to the electric supply circuit is fully described in my copending U. S. application Serial No. 78,100 filed December 29, 1925.

As illustrated in Figs. 4, 5 and 6 the switch panel 17 comprises a box-shape member 44, having a bottom portion 45 and side members 46, 47, 48 and 49, and a pair of angle irons 22 attached to the sides 48 and 49. The member 44 is made from a flat piece of sheet metal in which rectangular openings 51, 52, 53 and screw holes 54 are punched. Rectangular portions are cut out at the corners of the aforesaid piece of sheet metal and the edges thereof bent over to form the sides 46, 47, 48 and 49 the bottom 45 and an integral lug member 50 of the box-shape member 44.

The angle iron members 22 are preferably spot-welded, to the sides 48 and 49 of member 44. A portion of one side of the angle iron members 22 is cut away at the top end thereof and a corresponding portion 55 on the other side thereof is bent over and a bolt hole 56 punched therein.

The particular switch panel 17 illustrated in Fig. 4 is suitable to support five three-heat snap switches 43, only one of which is shown in place, that are mounted on insulating bases 57, and a circuit breaker mechanism 58 that is mounted in the opening 53.

The insulating bases 57 are held in operative position on the bottom 45 of the box-shape member 44 by screw bolts 58' that extend through openings 59 in the switch base member 57 and openings 54 in said bottom. The openings 59 are made substantially larger in diameter than the screw bolts in order that the switches 43 may be adjusted to permit of proper alinement of the spindle members 60 thereof in order that they may register properly with openings 61 in the panel 24.

Terminals 62 and 63 of the switches 43 are electrically connected to an electric supply circuit by bus bars 64 and 65. The bus bars 64 and 65 are clamped between strap members 66 and 67 and screw bolts 68 and 69 of the terminals 62 and 63. Conductors 40, 41 and 42 leading from the heating units 34 enter through holes 52 and are connected to terminals 71, 72 and 73 of the switches 43.

The circuit breaker 58 is held in position in the opening 53 by a screw bolt 74, that passes through the lug 50 and a member 75 of the circuit breaker, and a pin 76 that extends through the bottom member 45 at its lower edge and an extending arm 77 of said circuit breaker.

In Fig. 1, I have shown the switch panel 17 in its operative position. The panel 17 fits into the box-shape member 16 at the front of the range. The angle irons 22 thereof are in supporting engagement with the stove top 18 at the front thereof and are held in position by screw bolts 78 and 79.

The channel guides 36 are bolted to the angle irons 22 by screw bolts 80 and 81 which extend through holes 82 and 83 located in said angle irons. The panel 24 which extends across the front of the stove structure 13 is held in position by a base band 84, trim pieces 85, only one of which is shown, and screw bolts 86 and 87 which extend through holes in the trim pieces 85 and the panel 24 that line up with holes 88 and 89 in the angle irons 22.

The switch panel comprising the members illustrated in Fig. 4 can be assembled and then placed in proper position in the range, thus making the assembly of the parts shown very easy. The angle iron members of the switch panel serve to support the stove top and also the crumb tray through the channel guide members.

Further modifications in my invention may be made without departing from the spirit and the scope thereof, I therefore, desire that only such limitations shall be placed thereon as are imposed by the prior art.

I claim as my invention:

1. In an electric range, the combination with a supporting frame, an oven member, a stove member and electric heating units in the two members, of a switch supporting panel located on said supporting frame and effective to support said stove member, and a plurality of switches in said panel and secured thereto for the heating units, said panel and switches being removable and insertible as a unit below and independently of said stove member.

2. In an electric range, the combination with a supporting frame, an oven member, a stove member and a crumb tray associated with said stove member, of a switch supporting panel located on said supporting frame and embodying a member of box shape and angle bars attached thereto, the angle bars being effective to support the stove member, and the member of box shape supporting the crumb tray.

3. In an electric range, the combination with a supporting frame, an oven member, and a stove member, of an independently removable switch supporting panel comprising an integral preshaped member of box shape and a plurality of preshaped cooperating angle bars attached thereto, said angle bars being effective to partially support said stove member.

4. In an electric range, the combination with a supporting frame, an oven member, a stove member, a drip pan associated with said stove member, and electric heating units associated with the two members, of a switch supporting panel, located on said supporting frame and effective to support the above member and the drip pan, comprising an integral preshaped member of box shape, having suitable holes therein, a pair of angle irons attached thereto, and a plurality of switch members attached thereto for selectively energizing said heating units.

In testimony whereof, I have hereunto subscribed my name this 20th day of November, 1925.

FRANK F. FORSHEE.